(12) United States Patent
Cioffi et al.

(10) Patent No.: US 9,391,744 B2
(45) Date of Patent: Jul. 12, 2016

(54) METHOD AND APPARATUS FOR ANALYZING AND MITIGATING NOISE IN A DIGITAL SUBSCRIBER LINE

(71) Applicant: ADAPTIVE SPECTRUM AND SIGNAL ALIGNMENT, INC., Redwood City, CA (US)

(72) Inventors: John M. Cioffi, Atherton, CA (US); Wonjong Rhee, San Francisco, CA (US); Georgios Ginis, San Mateo, CA (US); Sumanth Jagannathan, Palo Alto, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 0 days.

(21) Appl. No.: 14/162,133

(22) Filed: Jan. 23, 2014

(65) Prior Publication Data

US 2014/0133539 A1 May 15, 2014

Related U.S. Application Data

(62) Division of application No. 13/848,668, filed on Mar. 21, 2013, now abandoned, and a division of application No. 12/375,216, filed as application No. PCT/US2007/017077 on Jul. 31, 2007, now Pat. No. 8,428,225.

(60) Provisional application No. 60/834,436, filed on Jul. 31, 2006.

(51) Int. Cl.
*H04M 1/24* (2006.01)
*H04L 1/20* (2006.01)
*H04B 1/10* (2006.01)
*H04B 3/32* (2006.01)
*H04L 12/26* (2006.01)
*H04M 3/22* (2006.01)
*H04L 12/24* (2006.01)
*H04M 3/30* (2006.01)

(52) U.S. Cl.
CPC ............... *H04L 1/20* (2013.01); *H04B 1/1027* (2013.01); *H04B 3/32* (2013.01); *H04L 43/0823* (2013.01); *H04M 3/2209* (2013.01); *H04L 41/0213* (2013.01); *H04L 43/16* (2013.01); *H04M 3/30* (2013.01)

(58) Field of Classification Search
CPC ........ H04B 17/00; H04B 12/28; H04B 11/00; H04B 11/06; H04B 3/46; H04B 1/1027; H04B 1/10; H04B 15/00; H04B 15/02; H04B 1/1036; H04B 3/23; H04B 3/30; H04B 3/32; H04M 3/22; H04M 3/08; H04M 3/306; H04M 3/32; H04M 3/30; H04M 3/34; H04M 3/23; H04M 3/18; H04M 3/46; H04M 1/24; H04M 1/38; H04M 11/062; H04M 3/2209; H04M 3/304; H04M 3/085; H04M 2201/18; G01R 31/08; H04L 27/2608; H04L 1/0002; H04L 43/16; H04L 12/2856; H04L 1/0009; H04L 1/0071; H04L 1/20; H04L 1/0019; H04L 43/0847; H04L 43/0894; H04L 41/0853; H04L 43/0888; H04L 5/1438; H04L 5/006; H04L 43/0829; H04L 43/00; H04L 43/08; H04L 1/0001; H04L 1/0061; H04L 1/0021; H04L 1/24; H04L 2012/6478; H04L 2012/2697; H04L 2012/42; H04L 41/0806; H04L 41/142; H04L 27/2647; H04L 25/067; H04L 41/06; H04L 41/5009; H04L 41/5032; H04L 43/045; H04L 43/0823; H04L 43/50; H04L 5/1446; H04L 12/24; H04L 41/145; H04L 12/2874; H04L 12/2898; H04L 12/6418; H04L 43/106; H04W 24/00; H04W 28/04; H04W 40/12
USPC ............... 379/1.01–1.04, 2, 6.01–26.02, 379/27.01–27.08, 28, 29.01–29.09, 29.1, 379/29.11, 30–35; 370/503, 351, 222, 260; 375/227, 222, 224, 228
See application file for complete search history.

(56) References Cited

U.S. PATENT DOCUMENTS

| | | | |
|---|---|---|---|
| 7,593,494 B1* | 9/2009 | Ghobrial et al. | 375/350 |
| 2002/0172188 A1 | 11/2002 | Wunsch | |
| 2005/0111561 A1 | 5/2005 | Sedarat et al. | |
| 2005/0123027 A1* | 6/2005 | Cioffi et al. | 375/222 |
| 2005/0123028 A1* | 6/2005 | Cioffi et al. | 375/222 |
| 2005/0141673 A1 | 6/2005 | Lunt et al. | |
| 2008/0232444 A1 | 9/2008 | Tzannes | |

FOREIGN PATENT DOCUMENTS

| | | |
|---|---|---|
| CN | 101785202 | 7/2010 |
| WO | WO-2006/041663 | 4/2006 |
| WO | WO-2008/016585 | 2/2008 |

OTHER PUBLICATIONS

International Preliminary Report on Patentability for International Application No. PCT/US2007/017077, mailed Mar. 25, 2010, 7 pages.
Non-Final Office Action for U.S. Appl. No. 12/375,216, mailed Nov. 7, 2011, 18 pages.
Final Office Action for U.S. Appl. No. 12/375,216, mailed Mar. 6, 2012, 20 pages.
Non-final Office Action for Chinese Patent Application No. 20078008511.2, mailed Apr. 20, 2012, 5 pages.
Decision of Grant for Japanese Patent Application No. 2009-522833, mailed Dec. 10, 2012.
Notice of Allowance for U.S. Appl. No. 12/375,216, mailed Dec. 21, 2012.
Notice of Allowance for European Patent Application No. 07810931.1, mailed Jan. 24, 2013.
Notice of Allowance for Chinese Patent Application No. 200780028511.2, mailed Feb. 5, 2013.
Non-Final Office Action for U.S. Appl. No. 13/848,668, mailed Oct. 23, 2013.
Second Notice of Allowance for European Patent Application No. 07810931.1, mailed Dec. 3, 2013.
Third Notice of Allowance for European Patent Application No. 07810931.1, mailed Sep. 19, 2014.
Fourth Notice of Allowance for European Patent Application No. 07810931.1, mailed Jun. 8, 2015.
First Examination Report for Indian Patent Application No. 314/MUMNP/2009, mailed Jun. 24, 2015.
Non-Final Office Action mailed Sep. 1, 2015 for Chinese Patent Application No. 2013/0141631.0.
International Search Report and Written Opinion mailed Mar. 16, 2010, for PCT Patent Application No. PCT/US2007/017077.
International Status Report mailed Nov. 17, 2009, for PCT Patent Application No. PCT/US2007/017077.

* cited by examiner

*Primary Examiner* — Leshui Zhang
(74) *Attorney, Agent, or Firm* — Green, Howard & Mughal LLP

(57) ABSTRACT

Data indicative of a level of stability of a DSL link is received. Based on the received data, it is determined whether the data indicates a level of stability of the DSL link that is above or below and minimum threshold. If the level of stability of the DSL link is below the minimum threshold, die noise associated with the DSL link before the time of failure is compared with the noise of failure. If the difference between the noise before and after the time of failure exceeds a threshold, then the difference in noise is characterized as a stationary noise associated with the DSL link. However, if the difference between the noise before and after the time of failure is below the threshold, a determination is made whether the failure is associated with a loss of power to the DSL link or a severe impulse noise event the difference in noise is characterized accordingly. Finally, the characterization of the noise associated with the DSL link is preserved for subsequent possible reconfiguration of the DSL link to improve link stability.

17 Claims, 8 Drawing Sheets

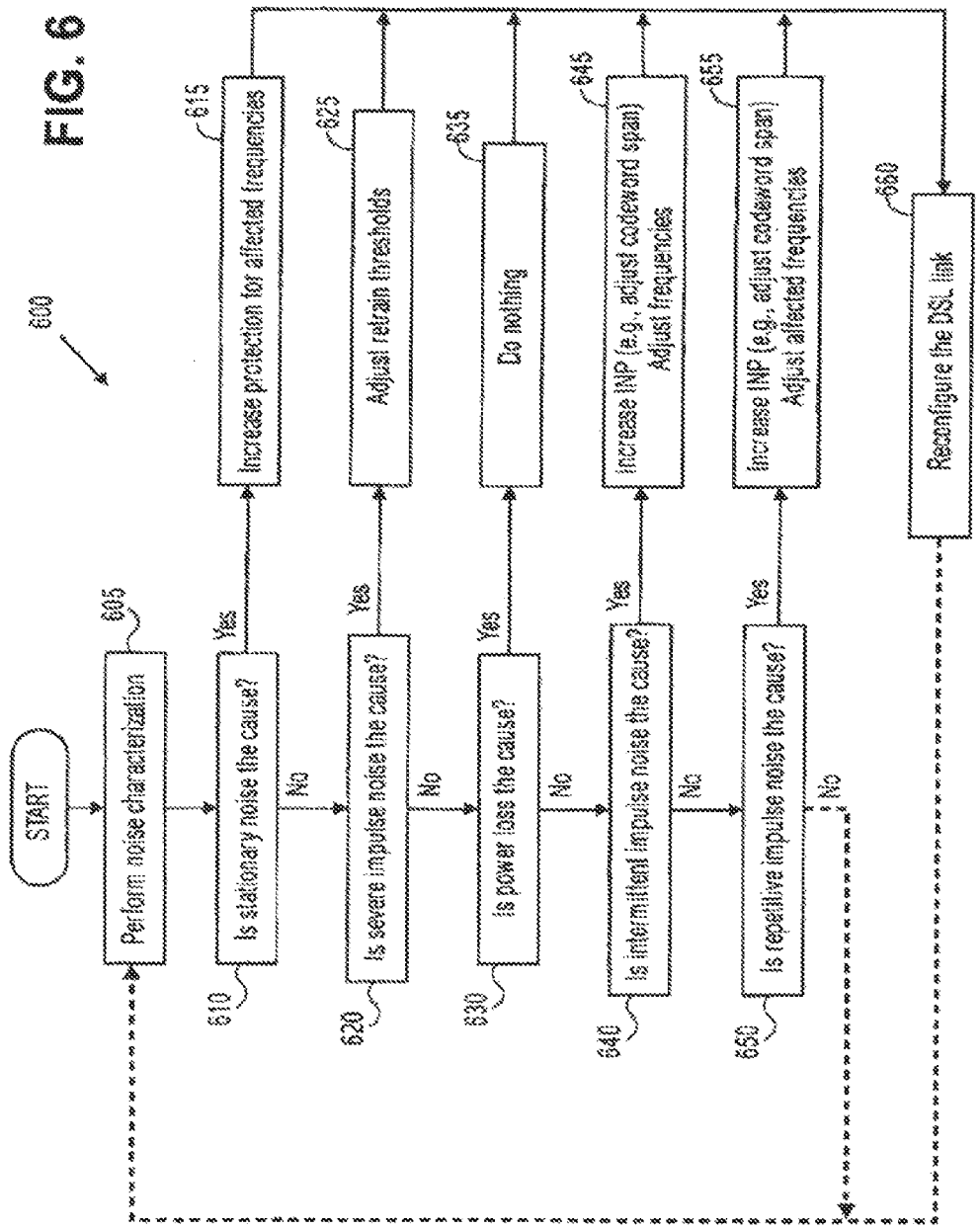

METHOD AND APPARATUS FOR ANALYZING AND MITIGATING NOISE IN A DIGITAL SUBSCRIBER LINE

CROSS REFERENCE TO RELATED APPLICATIONS

This application is a divisional of and claims priority to U.S. application Ser. No. 13/848,668, filed Mar. 21, 2013, which is a divisional of U.S. application Ser. No. 12/375,216, filed Aug. 24, 2009 and now issued, U.S. Pat. No. 8,428,225, which is a 371 of PCT/US07/17077, filed May 31, 2007, which claims the benefit of U.S. Provisional Patent Application No. 60/834,436, entitled DSL System, filed Jul. 31, 2006. This application is related to U.S. patent application Ser. No. 10/795,593, entitled Adaptive Codeword Management, filed 8 Mar. 2004 and now issued, U.S. Pat. No. 7,428,669. This application is related to U.S. patent application Ser. No. 10/817,128, entitled DSL System Estimation and Parameter Recommendation, filed 2 Apr. 2004 and now issued, U.S. Pat. No. 7,302,379. This application is related to Patent Cooperation Treaty (PCT) Application No. US2006/026796, entitled Adaptive Margin and Band Control, filed 8 Jul. 2006.

BACKGROUND OF THE INVENTION

1. Field of the Invention

This invention relates generally to a method and apparatus for analyzing and improving the quality and stability of digital communication systems. More specifically, this invention relates to analyzing and mitigating link failures and errors in a DSL system.

2. Description of Related Art

Digital subscriber line (DSL) technologies provide potentially large bandwidth for digital communication over existing telephone subscriber lines (referred to as loops and/or the copper plant). Telephone subscriber lines can provide this bandwidth despite their original design for only voice-band analog communication. In particular, asymmetric DSL (ADSL) and very-high-speed DSL (VDSL) can adjust: to the characteristics of the subscriber line by using a discrete multitone (DMT) fine code that assigns a number of bits to each tone (or sub-carrier), which can be adjusted to channel conditions as determined during training and initialization of the modems (typically transceivers that function as both transmitters and receivers) at each of the subscriber line. DSL systems can use vectoring technologies, where joint transmitter and/or joint receiver signal processing can be performed among multiple pairs to mitigate the effects of crosstalk interference, and thus to improve performance.

DSL systems would further benefit from determining the cause of DSL link instability and/or poor link quality that can lead to DSL link failures or link errors, and taking measures to improve link stability and/or link quality.

SUMMARY

An embodiment of the invention comprises a means and method to collect data, perform analysis of the data to characterize causes leading to DSL link failures and or DSL link errors, and once the causes are determined, reconfiguring the DSL link to mitigate the failures and/or errors.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiments in this disclosure are not necessarily to the same embodiment, and such references mean "at least one."

FIG. 6 illustrates a flow diagram in accordance with one embodiment of the invention.

DETAILED DESCRIPTION OF THE INVENTION

Figure 1:
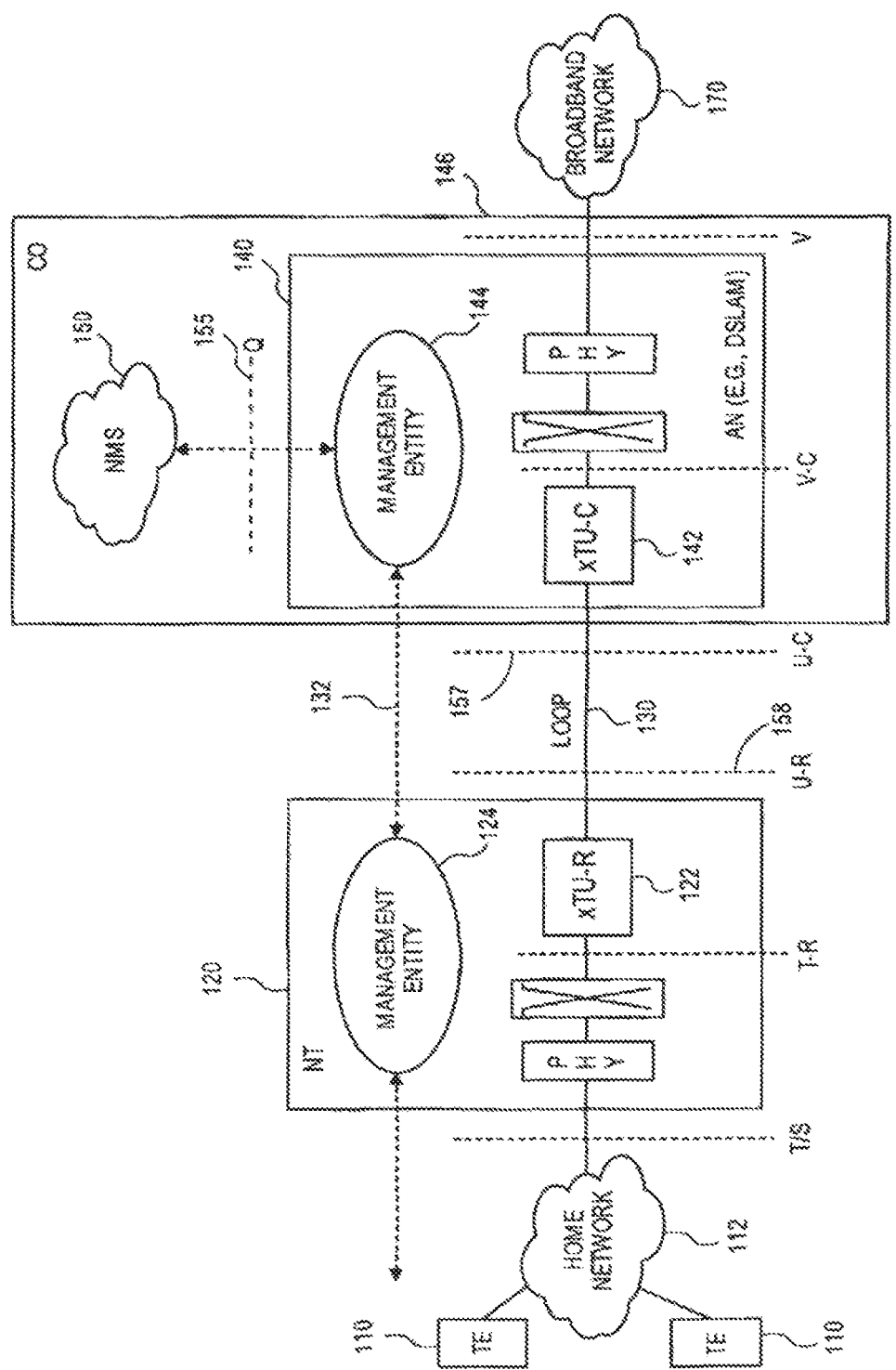
FIG. 1 shows the reference model diagram for a DSL system from the ITU-TG.997.1 standard.

FIG. 1 shows the reference model system according to the G.997.1 standard (G-ploam). This model applies to all ADSL systems meeting the various standards that may or may not include splitters, such as ADSL1 (G.992.1), ADSL-Lite (G.992.2), ADSL2 (G.992.3), ADSL2-Lite G.992.4, ADSL2+ (G.992.5) and G.993.1 and G.993.2 VDSL standards, as well as the G.991.1 and G.991.2 SHDSL standards, all with and without bonding. This model is well known to those skilled in the art.

The G.997.1 standard specifies the physical layer management for ADSL transmission systems based on the clear embedded operation channel (EOC) defined in G.997.1 and use of indicator bits and EOC messages defined in G.992.x and G.993.x standards. Moreover, G.997.1 specifies network management elements content for configuration, fault and performance management. In performing these functions, the system utilizes a variety of operational data that is available at an access node (AN).

In FIG. 1, users' terminal equipment 110 is coupled to a home network 112, which in turn is coupled to a network termination unit (NT) 120. NT 120 includes an xTU-R 122 (for example, a transceiver defined by one of the ADSL standards) or any other suitable network termination modem, transceiver or other communication unit. NT 120 also includes a management entity (ME) 124. ME 124 can be any suitable hardware device, such as a microprocessor, microcontroller, or circuit state machine in firmware or hardware, capable of performing according to any applicable standards and/or other criteria. ME 124 collects and stores performance data in its Management Information Base (MIB), which is a database of information maintained by each ME. The MIB can be accessed via network management protocols such as SNMP (Simple Network Management Protocol), an administration protocol used to gather information from a network device to provide to an administrator console/program, or via TL1 commands, TL1 being a well known command language used to program responses and commands between telecommunication network elements.

Each xTU-R in a system is coupled to an xTU-C in a Central Office (CO) or other central location. In FIG. 1, xTU-C 142 is located at an access node (AN) 140 in a CO 146. An ME 144 likewise maintains an MIB of performance data pertaining to xTU-C 142. The AN 140 may be coupled to a broadband network 170 or other network, as will be appreciated by those skilled in the art. xTU-R 122 and xTU-C 142 are coupled together by a loop 130, which in the case of ADSL and VDSL typically is a telephone twisted pair that also carries other communication services.

Several of the interfaces shown in FIG. 1 are used for determining and collecting performance data. The Q-interface 155 provides the interface between the Network Management Station (NMS) 150 of the operator and ME 144 in AN 140. All of the parameters specified in the G.997.1 standard apply at the Q-interface 155. The near-end parameters supported in ME 144 are derived from xTU-C 142, while the fat-end parameters from xTU-R 122 can be derived by either of two interfaces over the U-interface. Indicator bits and EOC messages, which are sent using embedded channel 132 and are provided at the PMD layer, can be used to generate the xTU-R 122 parameters in ME 144. Alternately, the Operation Administration and Management (OAM) channel and a suitable protocol can be used to retrieve the parameters from xTU-C 122 when requested by ME 144. Similarly, the fat-end parameters from xTU-C 142 can be derived by either of two interfaces over the U-interface. Indicator bits and EOC messages, which are provided at the PMD layer, can be used to generate the xTU-C 142 parameters in ME 122 of NT 120. Alternately, the OAM channel and a suitable protocol can be used to retrieve the parameters from xTU-C 142 when requested by ME 124.

At the U-interface (which is essentially loop 130), there are two management interfaces, one at xTU-C 142 (the U-C interface 157) and one at xTU-R 122 (the U-R interface 158). Interface 157 provides xTU-C near-end parameters for xTU-R 122 to retrieve over the U-interface 130. Similarly, interface 158 provides xTU-R near-end parameters for xTU-C 142 to retrieve over the U-interface 130. The parameters that apply may be dependent upon the transceiver standard being used (for example, G.992.1 or G.992.2).

The G.997.1 standard specifies an optional OAM communications channel across the U-interface. If this channel is implements, xTU-C and xTU-R pairs may use it for transporting physical layer OAM messages. Thus, the transceivers 122, 142 of such a system share various operational and performance data maintained in their respective MTBs.

More information can be found regarding ADSL NMSs in DSL Forum Technical Report TR-005, entitled "ADSL Network Element Management" from the ADSL Forum, dated March 1998, which is well known to those skilled in the art. Also, as noted above, DSL Forum Technical Report TR-069, entitles "CEPE WAN Management Protocol" dated May 2004 is well known to those skilled in the art. Finally, DSL Forum Technical Report TR-064, entitled "LAN-Side DSL CPE Configuration Specification" dated May 2004 is well known to those skilled in the art. These documents address different situations for CPE side management. More information about VDSL can be found in the ITU standard G.993.1 (sometimes called "VDSL1") and the ITU standard G.993.2 (sometimes called "VDSL2"), as well as several DSL Forum working texts in progress, all of which are known to those skilled in the art. Additional information is available in the DSL Forum's Technical Report TR-057 (Formerly WT-068v5), entitled "VDSL Network Element Management" (February 2003) and Technical Report TR-065, entitled "FS-VDSL EMS to NMS Interface Functional Requirements" (March 2004) and Technical Report TR-106 entitled "Data Model Template for TR-069 Enabled Devices," as well as in the revisions of ITU standard G.997.1 for VDSL2 MIB elements, or in the ATIS Dynamic Spectrum Management Report, ATIS-0600007. Further information may be found in DSL Forum draft working texts WT-105 entitled "Testing & Interoperability: ADSL2/ADSL2plus Functionality Test Plan" and WT-115 entitled "DSL Home Technical: TR-069 Implementation Guidelines.

As will appreciated by those skilled in the art, at least some of the parameters described in these documents can be used in connection with embodiments of the invention. Moreover, at least some of the system descriptions are likewise applicable to embodiments of the invention. Various types of operational data and information available from a DSL NMS can be found therein; others may be known to those skilled in the art.

In a typical topology of a DSL plant, in which a number of transceiver pairs are operating and/or available, part of each subscriber loop collocated with the loops of other users within a multi-pair binger (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk does to its proximity to other loops in the binder. After the pedestal, the drop wire is often unaffected by crosstalk due to its being farther away from other pairs for most of the drop, but transmission can also be more significantly impaired by electromagnetic interference because the drop wires are unshielded. Many drop wires have 2 to 8 twisted-pairs within them and in situations of multiple services to a home or bonding (multiplexing and demultiplexing of a single service) of those lines, additional substantial crosstalk can occur between these lines in the drop segment.

Figure 2:
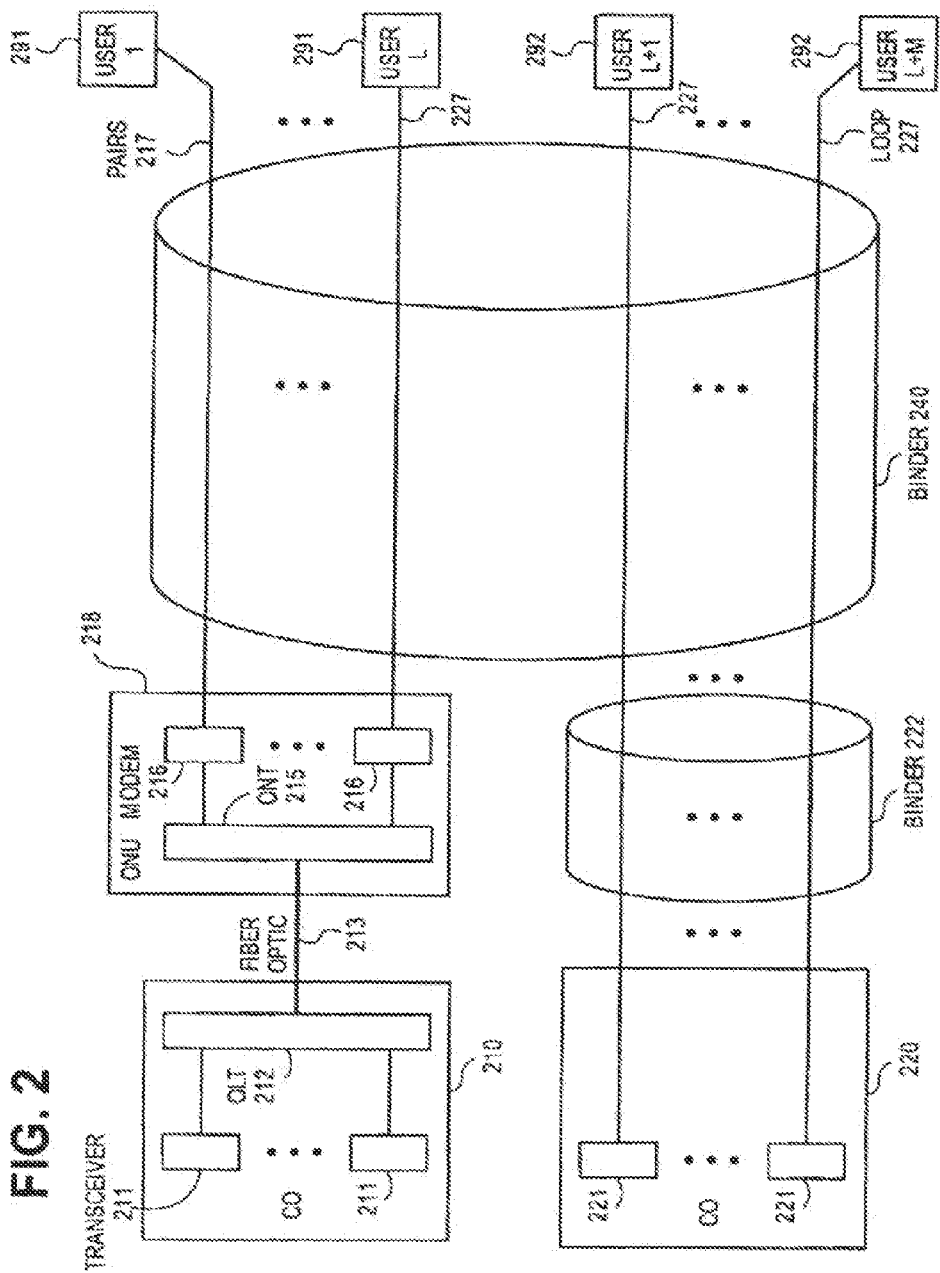
FIG. 2 illustrates a general schematic diagram of a DSL system, showing the layout and operation of the system.

A generic, exemplary DSL deployment scenario is shown in FIG. 2. All the subscriber loops of a total of (L+M) users 291, 292 pass through at least one common binder 240. Each user is connected to a Central Office 210, 220 through a dedicated line. However, each subscriber loop may be passing through different environments and mediums. In FIG. 2, L users 291 are connected to CO 210 using a combination of optical fiber 213 and twisted copper pairs 217, which is commonly referred to as Fiber to the Cabinet (FTTCab) or Fiber to the Curb. Signals from transceivers 211 in CO 210 have their signals converted by optical line terminal 212 and optical network terminal 215 in CO 210 and optical network unit (ONU) 218. Modems 216 in ONU 218 act as transceivers for signals between the ONU 218 and users 291.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. The existence of FTTCab loops can create problems to FTTEx loops. Moreover, FTTCab is expected to become an increasingly popular topology in the future. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder.

As can be seen in FIG. 2, the lines from CO 220 to users 292 share binder 222, which is not used by the lines between CO 210 and users 291. Moreover, another binder 240 is common to all of the lines to/from CO 210 and CO 220 and their respective users 291, 292.

Figure 3A:
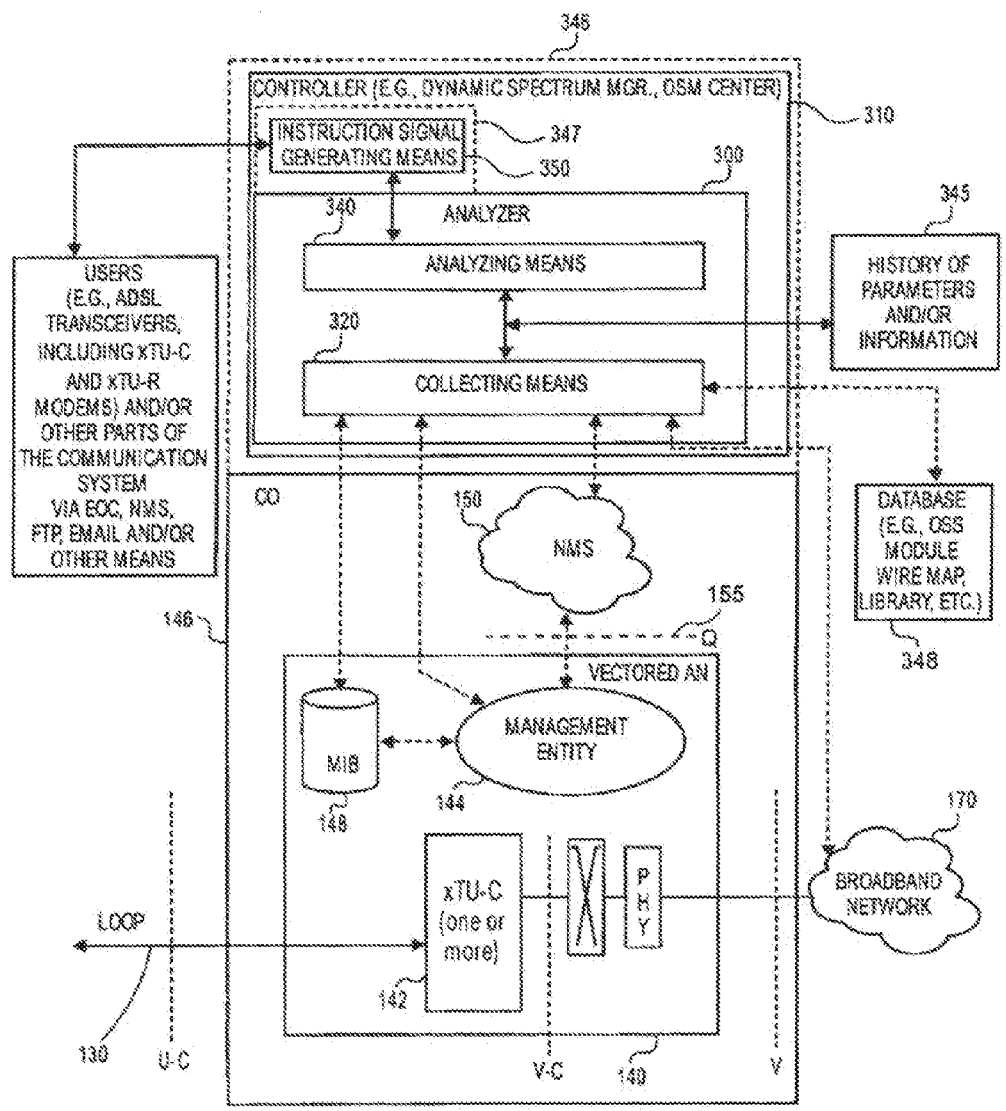
FIG. 3A illustrates a DSL optimizer coupled in communication with a DSL system in accordance with an embodiment of the invention.

According to one embodiment of the invention shown in FIG. 3A, an analyzer 300 may be part of an independent entity monitoring one or more DSL systems as a controller 310 (for example, a DSL optimizer, a dynamic spectrum manager or dynamic spectrum management center) assisting users and/or one or more system operators or providers in optimizing or otherwise controlling their use of the system. (A dynamic spectrum manager may also be referred to as a Dynamic Spectrum Management Center, DSM Center, DSL Optimizer, Spectrum Maintenance Center or SMC.) In some embodiments, the controller 310 may be operated by an Incumbent Local Exchange Carrier (ILEC) or Competitive Local Exchange Carrier (CLEC) operating DSL lines from a CO or other location. In other embodiments, a "smart" modem unit can have a controller (having, for example, a processor and memory) integrated with the modem in a user location, a central office or some other single location. As seen from the dashed line 346 in FIG. 3A, controller 310 may be in or part of the CO 146 or may be external and independent of CO 146 and any party operating within the system. Moreover, controller 310 may be connected to and/or controlling multiple COs. Likewise, components of controller 310 may or may not be in the same location and/or equipment, and/or may instead be accessed by the controller at different locations.

In the exemplary system of FIG. 3A, the analyzer 300 includes collecting means 320 (which also may perform monitoring, if desired) and analyzing means 340. As seen in FIG. 3A, the collecting and/or monitoring means 320 may be coupled to and may collect data through and from sources internal to a DSL system, such as NMS 150, ME 144 at AN 140 and/or the MIB 148 maintained by ME 144. Data also may be collected from external sources by means 320 through the broadband network 170 (for example, via the TCP/IP protocol or other means outside the normal internal data communication systems within a given DSL system). Also, the collecting mean 320 may have access to one or more databases or other sources 348, storing binder-level information, such as deployment information, topology information, crosstalk coupling, etc, or information about modem capabilities, such as procedures for bit loading and power allocation, and service priorities. The controller may collect operational data from an xTU-R over the Internet or event from an xTU-C over the Internet if the EMS bandwidth is limited or if the EMS is uncooperative (for example, by blocking reported management data because the equipment manufacturer wishes to perform the management internally to its equipment). Operational data also can be collected from the NMS of the service provider, which may be collecting form various sources itself.

Analyzing means 340 and/or monitoring/collecting means 320 may also be coupled to a source 345 of parameter history and/or other such related information, such as a database or memory that may or may not be part of the analyzer 300 or controller 310. One or more of the analyzer's connections allows the analyzer 300 to collect operational data. Data may be collected once (for example, during a single transceiver training) or over time. In some cases, the monitoring means 320 will collect data on a periodic basis, though it also can collect data on-demand or any other non-periodic basis, thus allowing the analyzer 300 to update its user and line data, if desired.

Analyzing means 340 is capable of analyzing data provided to it to determine whether instructions need to be sent to one or more modems to assist the modems in mitigating noise effects. The analyzing means 340 of analyzer 300 is coupled to an instruction-signal generating means 350 in the controller 310. Signal generator 350 is configured to accept a parameter value generated by the analyzing means 340 for use by a modem, where the parameter value is based on the operational data and is calculated to assist at least one modem in mitigating noise, improving stability, eliminating failures or reducing errors. Signal generator 350 is configured to send instruction signals to users in the communication system (for example, ADSL transceivers such as ATU-Cs). As indicated by the dashed line 347, the instruction signal generating means 350 may or may not be part of the analyzer 300 and/or be implemented in the same hardware, such as a computer system. Instruction signal generator 350 constitutes a means for regulating one or more parameter values in the modem pair.

Figure 3B:
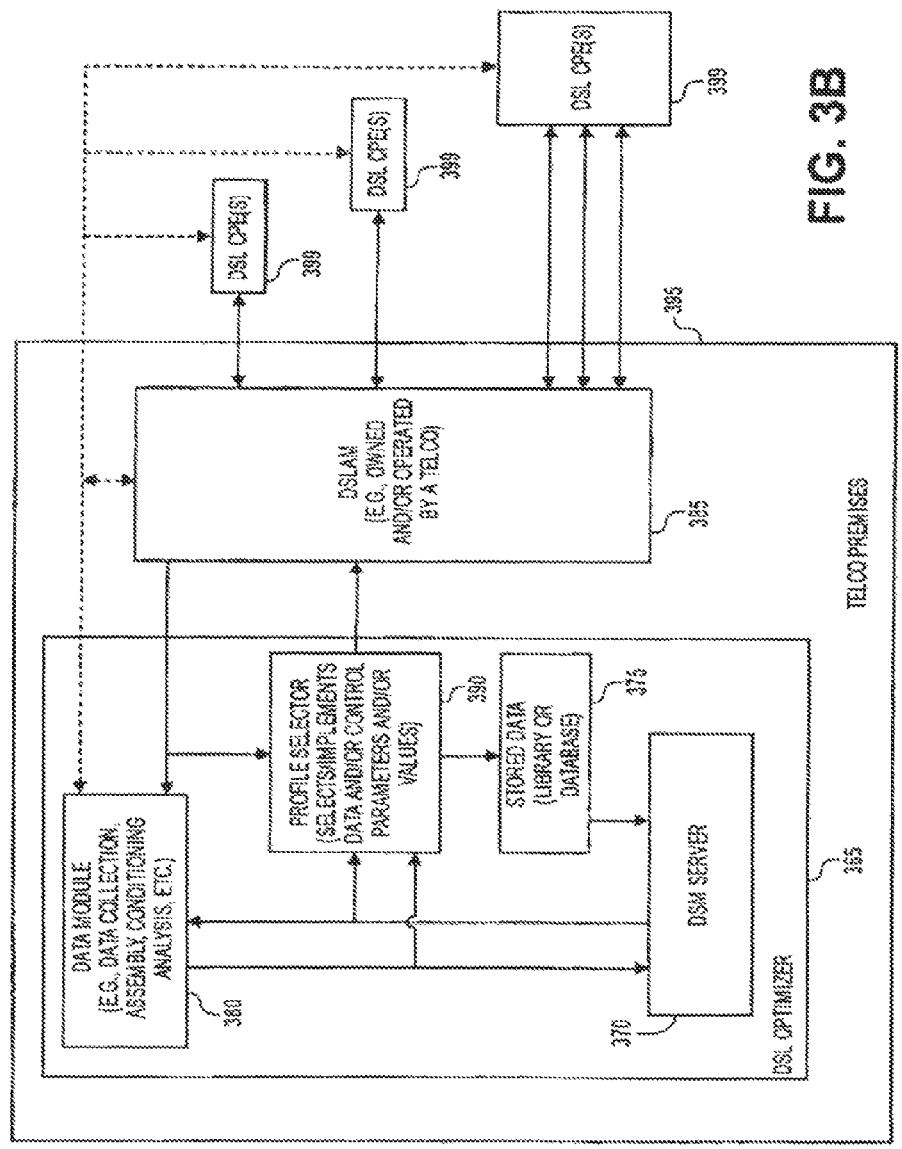
FIG. 3B illustrates a DSL optimizer that operates in connection with a DSLAM in accordance with an embodiment of the invention.

Another embodiment of the invention is shown in FIG. 3B. A DSL optimizer 365 operates on and/or in connection with a DSLAM 385 or other DSL system component (for example, an RT, ONU/LT, etc.), either or both of which may be on the premises 395 of a telecommunication company (a "telco"). The DSL optimizer 365 includes a data module 380, which can collect, assemble, condition, manipulate and/or supply operational data for and to the DSL optimizer 365. Module 380 can be implemented in one or more computers such as PCs, workstations, or the like. Data from module 380 is supplied to a DSM server module 370 for analysis (for example, determining the availability of profiles, transitions to be implemented, etc. based on collected operational data fro given communication lines, control and operational changes to the communications system, reported modem capabilities, etc.). Information also may be available from a library or database 375 that may be related or unrelated to the telco. A profile selector 390 may be used to implement signals affecting operation of the communication system. Such decisions may be made by the DSM server 370 or by any other suitable manner, as will be appreciated by those skilled in the art. Operational modes selected by selector 390 are implemented in the DSLAM 385 and/or any other appropriate DSL system component equipment. Such equipment may be coupled to DSL equipment such as customer premises equipment 399. Device 385 can be used to implement any ordered changes based on allowable profiles, performance enhancement, etc. considered by the DSL optimizer 365. The system of FIG. 3B can operate in ways analogous to the system of FIG. 3A, as will be appreciated by those skilled in the art, though differences are achievable while still implementing embodiments of the invention.

The collecting means 320 or the data module 380 also may be coupled to the corresponding modules of a second controller or DSL optimizer. Thus, operational data can be collected from other DSL lines, even when they are not controlled by the same DSL optimizer, DSM center or SMC. Conversely, a controller 310 or DSL optimizer 365 may provide operation data of its own DSL lines to a public or private database (for example, a public or privately controlled web site or connection where DSL management entities can share data appropriately) for appropriate use by regulators, service providers and/or other DSL optimizers. As will be appreciated by these skilled in the art, if the controller is a wholly independent entity (that is, not owned and/or operated by the company owning and/or operating lines within the CO), much of the DSL system's configuration and operational information may be unavailable. Even in cases where a CLEC or ILEC operates and/or functions as the controller 310, much of this data may be unknown.

Figure 8:
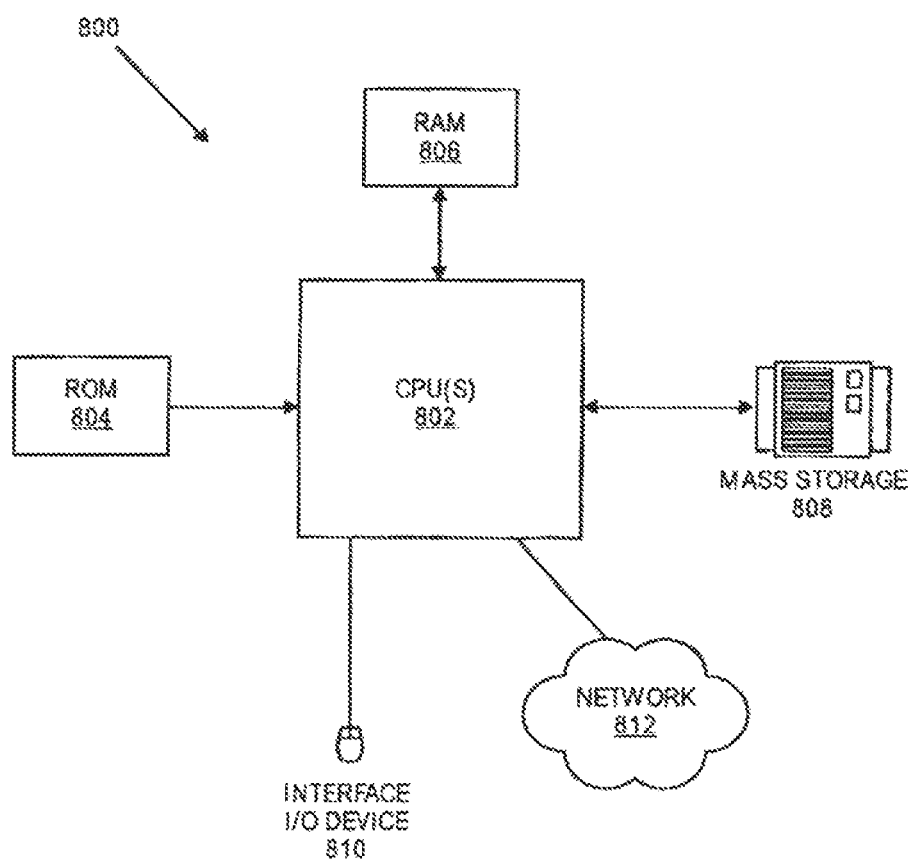
FIG. 8 illustrates a computer system for use by a user and/or controller in accordance with one or more embodiments of the invention.

In some embodiments of the invention, the analyzer 300 may be implemented in a computer such as a PC, workstation or the like (one example of which is disclosed in connection with FIG. 8). The collecting means 320, analyzing means 340 and/or instructing signal generating means 350 may be software modules, hardware modules or a combination of both, as will be appreciated by those skilled in the art. These components may all reside in the same computer system, for example, or may be in distinct apparatus. For management of large numbers of lines, databases may be introduced and used to manage the volume of data generated by the lines and the controller.

An embodiment of the invention can be characterized in two parts: noise characterization, and noise mitigation. A discussion of noise characterization is provided next, followed by a discussion of noise mitigation.

Noise Characterization

Figure 4:
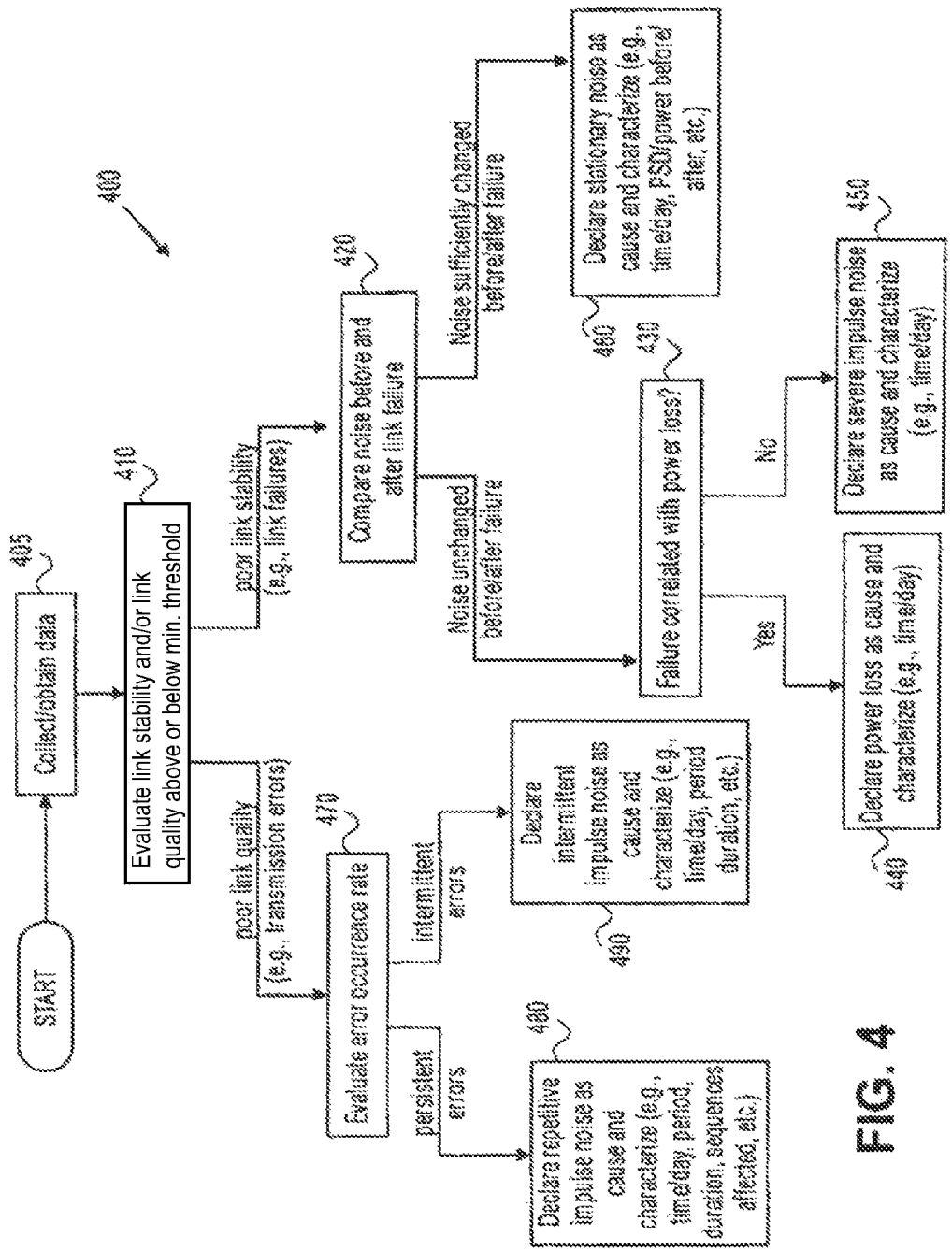
FIG. 4 illustrates a flow diagram in accordance with one embodiment of the invention.

With reference to FIG. 4, one embodiment of the invention is described. At module 405, data is collected. Data collection can be performed as described above with reference to FIG. 3A and FIG. 3B. Data collection may be performed multiple times. Data collected may include instantaneous values (value at time of data collection), or a history of values (values obtained at various times before data collection). Data that represent counters (e.g. Code Violations (CV), Errored Seconds (ES)) may be represented as vectors, wherein each element in the vector is a count within a known time interval. Data can include parameters related to the Central Office (CO-side, or sometimes referred to as Near-End, NE), or to the Customer Premises (CP-side, or sometimes referred to as Far-End, FE).

In one embodiment of the invention the parameters to collect may include:

From G.997.1:
Line Inventory
    G.994.1 vendor ID
    System vendor ID
    Version number
    Serial number
Channel List, Diagnostic and Status Parameters
    Actual Data Rate
    Actual Interleaving Delay
    Actual framer settings:
        NFEC, RS codeword size
        RFEC, RS parity bytes
        LSYMB, bits per symbol
        INTLVDEPTH, interleaver depth
        INTLVBLOCK, interleaver block size
Line Test, Diagnostic and Status Parameters
    LATN, line attenuation
    SATN, signal attenuation
    SNRM, SNR margin
    ACTPSD, actual PSD level
    UPBROKE, electrical length
    ACTATP, actual aggregate transmitted power
    HLIN, complex channel response
    HLOG, magnitude of channel response
    QLN, quiet line noise
    SNR
    BITS
    GAINS
    TSS, transmit spectral shaping
    MREFPSD, reference PSD
    TRELLIS
    ACTUALCE, cyclic extension length
Channel Performance Monitoring Parameters
    CV, code violations
    FEC, forward-error corrections
Line Performance Monitoring Parameters
    FECS, FEC seconds
    ES, errored seconds
    SES, severely errored seconds
    LOSS, loss-of-signal seconds
    UAS, unavailable seconds
    Full initializations (or REINIT)
    Failed initializations
Line Failures
    LOS, loss of signal failure
    LOF, loss of frame failure
    LPR, loss of power failure
    LINIT, line initialization failure
From WT-135 Revision 4:
    Object STBService.(i).AVStreams.-AVStream.(i).IP.RTP.Stats
    PacketsReceived
    BytesReceived
    PacketsLost
    FractionLost
    CorruptedPackets
    Overruns
    Underruns
    ReceiveInterarrivalJitter
    AverageReceiveInterarrivalJitter
    Object STBService.(i).AVStreams.-AVStream.(i).MPEG2TS.Stats
    PacketsReceived
    PacketDiscontinuityCounter
    Overruns
    Underruns
Additional Parameters from the Dynamic Spectrum Management Technical Report:
    MSE, mean-square-error per tone
    Pb, probability of error per tone
    Xlog, Xlin, crosstalk coupling
    MARGIN[i], margin per tone
Additional Parameters:
    SOS notifications/events/counters (resulting in abrupt reduction of data rate)
    SRA (Seamless Rate Adaptation) notifications/events/counters
    Failure causes
    Bit-swap counts
    Bit distribution statistics (e.g. min-max-median-average per tone)
    Noise peak-to-average ratio (or noise peak in time domain)
    Echo response
    Loop impedance
    Impulse noise width (or related statistics)
    Impulse noise period (or related statistics)
    Impulse noise event duration (or related statistics)
    IPTV or MPEG delivery statistics such as outages, missing packets, error-concealed packets, retransmitted packets, missing/interpolated MPEG blocks, buffer overflows/underflows, retransmissions, etc.

Figure 5:
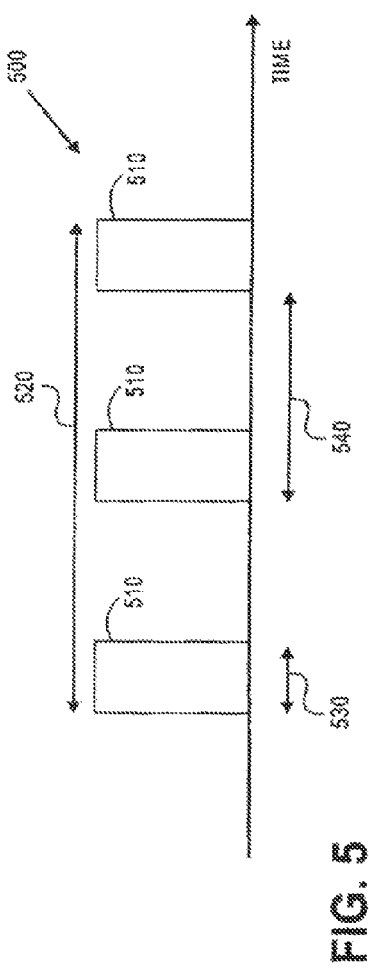
FIG. 5 illustrates a characterization of impulse noise over a time period.

Impulse noise can be characterized over time as shown in FIG. 5, where each noise pulse 510 in an event duration 520 has a width 530 and period 540. Statistics of these quantities (e.g. histograms, min, max, median, x % worst-case) can be computed and reported.

Module 410 evaluates link stability and link quality. For evaluation of the link stability, parameters such as the line failures specified above, full/failed initializations (also known as retrains), and unavailable seconds (UAS), are obtained as described above with respect to FIGS. 3A and 3B and module 405 of FIG. 4. In some embodiments, a distribution of these quantities over time is evaluated. For example, if the LOS is counted in 15 minute intervals, for a total measurement period of 1 day, there are 96 LOS counts. Evaluating the distribution of LOS means evaluating in how many intervals the LOS count was equal to 0, in how many intervals the LOS count was equal to 1, and so on.

Link stability levels are determined from such distributions. In one embodiment, for example, link stability is declared to be good, if all of the following conditions hold:

LOS=0 for 90% of the intervals,
LOS<=1 for 99% of the intervals,
LOS<=2 for 100% of the intervals.

Link stability is declared to be better than moderate, if all of the following conditions hold:

LOS=0 for 80% of the intervals,
LOS<=1 for 90% of the intervals,
LOS<=2 for 95% of the intervals,
LOS<=4 for 100% of the intervals.

Link stability is declared to be poor in all other cases.

Link stability levels may be determined by a combination of conditions such as the above for multiple parameters.

Module 420 of FIG. 4 compares noise before and after link failure. If the link stability is determined to be poor, then a further decision is made as to the type of noise/disturbance that is causing the poor link stability. A method to determine the type of noise/disturbance is to compare the noise at the DSL receiver before a link failure and after a link failure. (A link failure includes a so-called "SOS event" or an SRA event, where the modem in the DSL receiver remains operational, but reduces its data rate.) A significant difference between the measured noises indicates that the link failure occurred because of a substantial increase of the noise level. Comparable noise levels before and after the link failure indicate that causes other than an increase in the noise lead to the link failure.

Such comparisons may be made over multiple time periods corresponding to the multiple link failures, in order to draw more reliable conclusions. For example, the record of LOS (or full initializations) may be used to identify the time of a link failure. Multiple noise measurements may be obtained at times before and after the link failures. A change in the noise level may be considered to be the cause of the link failure if a substantial change in noise levels is observed for a certain percentage of the total number of link failures.

The noise measurement before the link failure is preferably made at least a few seconds before the link failure occurs. The noise measurement after the link failure should be made after the DSL link has reinitialized (or after the SOS or SRA procedure to reduce data rate has concluded) and is in stable conditions (e.g. signal to noise ration (SNR) margin is stable, CV count is low, etc.).

There are many techniques for evaluation the noise of a DSL receiver. In one method, the receiver reports the mean-square-error (MSE) of its decoder. Such error may correspond to a slicer's output, a trellis decoder's output, or a RS decoder output.

Alternately, the noise may be indirectly computed using other parameters. For example, if SNR, HLOG (channel attenuation), MREFPSD (transmitted PSD) and GAINS (gain scaling) are reported by a VDSL2 modem, then the mean-square-error of the receiver can be estimated by the following expression:

$$MSE(dBm/Hz) = HLOG(dB) + MPREFPSD(dBm/Hz) + GAINS(dB) - SNR(dB)$$

Yet another alternative method is to use SNR margin reported values as a measure of noise. SNR margin may be reported either as an average or per tone, and in either form it can be used to compare noise before and after a failure.

Further techniques for estimation of the receiver noise can be found in related U.S. patent application Ser. No. 10/817,128, entitled DSL System Estimation and Parameter Recommendation, file 2 Apr. 2004, published as United States Publication No. 2005/0123027 on 9 Jun. 2005.

The determination of a substantial change in noise levels typically is based on the difference between the noise before and after the failure. The difference is a vector of one or more values corresponding to different frequencies. In one embodiment, a substantial change is declared if the difference is found to exceed a certain threshold for a certain number of frequency points. Weighting factors may be applied to difference values of certain frequencies.

The determination of a substantial noise change can be used to diagnose the known issue of a "third wire". In certain countries/regions, the inside wiring for telephony services includes three wires, two for the transmission of the telephony signal, and one for the ringing signal. Such a practice is nowadays obsolete, however, there continue to exist home installations where a third wire is present. Unfortunately, this third wire seriously impairs DSL transmission, because it degrades the balance of the DSL signal transmission. As a result, external noise sources cause particularly strong interference on DSL. More specifically, time-varying noise sources then cause substantial noise changes, which can lead to link failures. Such noise changes can be detected using the embodiments described herein, and consequently, the presence of a third wire can be indicated as a possible root cause.

The determination of a substantial noise change can also be used to diagnose the more general condition of "problem with in-house wiring". It is occasionally the case that in-house wiring is poorly installed or maintained, which may degrade the balance of the DSL signal transmission, and make DSL transmission suffer from external noise sources. Again, detecting noise changes as described herein can aid with diagnosing in-house wiring problems.

Turning to module 430 of FIG. 4, one embodiment of the invention checks if the link failure is correlated with a power loss. If it is found that the noise before and after the link failure is not significantly different, then it is determined that the link failure may be the result of a power loss, or the result of a severe impulse noise event (for example, a voltage surge on the line). In order to differentiate between these cases, some additional checks can be performed:

Check if link failure is correlated with a loss-of-power (LPR) failure being reported. If an LPR is associated with a failure event, then the link failure happened because of a power disruption.

Check if a CPE modem (e.g. a USB CPE modem powered by a computer such as a Personal Computer (PC)), is used on the DSL link. If such a modem is used, then power-cycling or switching off the PC at the customer premises results in a line disconnection.

Check if neighboring links experience failures at the same or similar times. In such cases, it may be deduced that multiple links are suffering from severe impulse noise events.

Check for DSL receiver saturation, increase of received signal power, activation of circuit protection logic, overflow bits or similar activated indications. If such indications exist, then it is likely that a severe impulse noise event has occurred.

In all other cases, the link failure can be attributed to severe impulse noise events. Thus, the cause of the poor link stability can be identified either as power loss events, or as severe impulse events.

With reference to module 440, if the link failure is found to be correlated with a power loss, then information characterizing the link failure can be recorded, for example the time/day of link failure can be recorded to provide statistical information about the times, days when such events are most likely to happen.

At module 450, if the link failure is found to originate from a severe impulse event, then information characterizing the link failure can be recorded, for example the time/day of link failure can be recorded to provide statistical information about the times, days when such events are most likely to happen.

Returning to module 420, if it is found that the noise before and after the link failure is substantially different, then it is deduced that an abrupt change of the strength of the received noise is the cause of the link failure. Information characterizing the link failure may be recorded, for example, the time/day of link failure may be recorded to provide statistical information about the times, days when such events are most likely to happen.

The difference in the noise before and after the link failure can be stored and provides valuable information for reconfiguring the link to mitigate the effects of such noise changes. The difference effectively reveals the power over different techniques (power spectral density, PSD) of the noise source that causes the noise change. If such a difference is computed for multiple link failure events, an average can be computed to provide better reliability. As an alternative to measuring the noise difference, quantities such as the differences in the bit distributions can be used.

Returning to module 410, for evaluation of the link quality, channel performance monitoring parameters and/or line performance monitoring parameters are obtained as described above with reference to FIGS. 3A and 3B. In some embodiments of the invention, a distribution of these quantities over time is evaluated. Higher-layer parameters may also be obtained for applications such as IPTV or other video stream delivery. A list of such parameters is provided in the DSL Forum document WT-135 Revision 4, which is well known to those skilled in the art.

Link quality levels are determined from evaluation of such distributions. In one embodiment, for example, link quality is declared to be acceptable, if all of the following conditions hold:

CV<=1 for 95% of the intervals,
 CV<=10 for 99% of the intervals,
 CV<=100 for 100% of the intervals,
 SES<=1 for 95% of the intervals,
 SES<=15 for 99% of the intervals,
 SES<=60 for 100% of the intervals.

The link quality is declared to be unacceptable in all other cases.

Other quantities can be derived from the above parameters. These could include summations (e.g. UAS+SES), or more elaborate expressions (e.g. CV/(360c3-(SES+UAS)*400). Expressions such as these may be constructed for parameters associated with either the CO-side or the CP-side or with both the CO-side and the CP-side. Such expressions may be dependent on the vendor and/or system ID.

If at 410 the link quality is determined to be poor, then further analysis of the errors can be performed at module 470 to determine if the impulse noise events causing the poor quality are intermittent or persistent. The fundamental difference for such characterization is the impulse noise event duration (see FIG. 5).

A method to perform such characterization is to observe the code violation (CV) counters. Large values for the CV counters over a significant percentage of time indicate that the impulse noise event duration is long, and that the impulse noise can be classified as persistent or repetitive. An example criterion for declaring repetitive impulse noise is to satisfy at least one of the conditions below:

CV>=100 for 10% of the intervals, or
 CV>=1000 for 5% of the intervals.

Alternative parameters can be used, or criteria can be constructed using combinations of rules with multiple parameters such as:

FEC, number of corrected codewords
 FECS, FEC seconds
 ES, errored seconds
 SES, severely errored seconds
 LOSS, loss-of-signal seconds
 UAS, unavailable seconds CV and FEC are advantageous, because they have a finer granularity compared to counts of seconds. Any conditions derived from parameters such as the above may also incorporate performance parameters such as data rate and margin.

In some embodiments, more detailed information about the impulse noise may be provided by the DSL systems. For example, information may include:

Averages, statistics, or distributions of impulse noise width,
 Averages, statistics, or distributions of impulse noise period,
 Averages, statistics, or distributions of impulse noise event duration.

The impulse noise may then be characterized as repetitive if all of the conditions below are satisfied:

Impulse noise event duration>x seconds (e.g. 10 seconds)
 Impulse noise period<y milliseconds (e.g. 1000 milliseconds)
 Impulse noise width>z DMT symbols (e.g. 0.5 DMT symbols)

If these conditions are not met, then the noise is classified as intermittent impulse noise.

In other embodiments, the impulse noise may be characterized by examining information about network layers higher than the DSL physical layer. For example, information may include:

Averages, statistics, or distributions of lost or corrupted packets/MPEG frames.
 Averages, statistics, or distributions of packets inter-arrival jitter.
 Averages, statistics, or distributions of MPEG buffer over-runs and under-runs.

For example, the impulse noise may then be characterized as repetitive if all of the conditions below are satisfied:

Lost packets>x1 for 10% of the measurement intervals, or
 Lost packets>x2 for 5% of the measurement intervals.

Any of the above conditions may be dependent on the vendor and/or system ID.

As a next step 480, after declaring the cause of the poor link quality as repetitive impulse noise, further analysis may be performed.

Information characterizing the failure may be recorded, for example the time/day of poor quality can be recorded to provide statistical information about the times, days when such events are most likely to happen. This can be achieved for example by recording the intervals when CV or some other channel/line performance monitoring parameter exceeds a certain threshold.

The impulse noise event duration can be also estimated by using channel or line performance monitoring parameters and recording the length of time over which these parameters exceed a certain threshold.

The impulse noise width and period may also be estimated, if the intervals for measuring performance monitoring parameters are made short enough to be in the order of microseconds. Even if such short intervals are not possible, the repetitive impulse noise can still be approximately characterized based on the performance monitoring parameters. For example, the repetitive impulse noise may be characterized as level 1, if CV>=100 for 10% of the intervals, or
CV>=1000 for 5% of the intervals;

or may be characterized as level 2, if

CV>=100 for 20% of the intervals, or
CV>=1000 for 10% of the intervals.

Repetitive impulse noise may affect certain frequencies more than others. A method to identify the affected frequencies is next explained.

It has been observed that repetitive impulse noise can have an effect on the average noise experienced by a DSL receiver. If noise measurements are performed before an impulse noise event starts, and while an impulse noise events is in progress, then these noise measurements may be substantially different. (The same effect can be noticed by performing SNR margin measurements.) By recording the frequencies with the highest susceptibility to repetitive impulse noise. Methods taking advantage of such knowledge are discussed in more detail below.

If, at 470, intermittent impulse noise is declared the cause of the poor link quality, further analysis may also be performed. Information characterizing the link failure can be recorded, for example the time/day of poor quality can be recorded to provide statistical information about the times, or days when such events are most likely to happen. This can be achieved for example by recording the intervals when CV or some other channel/line performance monitoring parameter exceeds a certain threshold.

The impulse noise event duration, impulse noise width and impulse noise period may also be estimated using methods similar to those for repetitive impulse noise. Note that the noise characterization does not need to be unique in its declaration of the cause. For example, it may be determined that both link stability and link quality is poor, with abrupt noise changes contributing to link instability, and intermittent impulse noise contributing to the poor link quality. In such cases, an embodiment of the invention may implement the steps following steps 420 and 470, either sequentially or in parallel.

Noise Mitigation

With reference to FIG. 6, the noise mitigation actions depend on the results of noise characterization 605 as outlined in the above discussion. In one embodiment of the invention, noise mitigation is accomplished by DSL link reconfiguration as shown in FIGS. 3A and 3B. Multiple rounds of data collection and link reconfiguration may be performed to achieve suitable noise mitigation.

A list of parameters that may be controlled includes:
From G.997.1:
Line Configuration Parameters
  MAXNOMPSD, maximum nominal PSD
  MAXNOMATP, maximum nominal aggregate transmitter power
  MAXRXPWR, maximum received power
  CARMASK, carrier mask
  PSDMASK, PSD mask
  RFIBANDS, RFI bands
  DPBOSHAPED, downstream power back-off
  UPBOSHAPED, upstream power back-off
  TARSNRM, target SNR margin
  MAXSNRM, maximum SNR margin
  MINSNRM, minimum SNR margin
  MSGMIN, minimum rate for message overhead channel
Channel Configuration Parameters
  Minimum data rate
  Maximum data rate
  Maximum interleaving delay
  Minimum impulse noise protection
  FEC redundancy ratio
Additional from DSM TR:
  Margin cap mode
  Band preference
Additional Parameters:
  TARSNRM[n], target SNR margin per tone
  BCAP[n], bit cap per tone
  Retrain thresholds
  Retransmission parameters for DSL layer If at 605 stationary noise 610 is determined to be the cause of link instability, then at 615 one or more particular reconfigurations of the DSL link according to embodiments of the invention may mitigate the problem. Stationary noise analysis produces an estimate of the change of noise before and after a link failure. Estimates of the power spectral density of the new noise may provide extra protection to the affected frequencies, and to prevent a link failure when such a noise change is repeated.

A summary of possible counter-measures that can be employed at 615 to increase protection for affected frequencies follows:

1. Additional SNR margin may be provisioned for the DSL link, so that the noise change does not cause a drop of the SNR margin to negative values. This can be achieved by either reducing the maximum data rate of the DSL link, or by requiring a larger TARSNRM (target SNR margin).
2. The frequencies that are most affected by the abrupt noise change may be disabled. This can be achieved by either using CARMASK (carrier mask), or PSDMASK (PSD mask) to make sure that those frequencies are not loaded with any bits. Thus, an abrupt noise change will have a smaller effect on the DSL link.
3. The frequencies that are most affected by the abrupt noise change may be provided with additional margin. This can be achieved by appropriately programming the configuration parameters to assure that those frequencies have more margin compared to other frequencies, e.g. by using a tone-dependent TARSNRM[n] parameter as described in the standards contribution T1E1.4/1992-203 by John M. Cioffi of Amati Communications. Another very effective approach is to use a tone-dependent bit-cap (BCAP[n]) to prevent the affected frequencies from being loaded with too many bits, and thus assuring the extra protection.
4. A novel approach towards providing additional protection is to use a tone-dependent MAXSNRM[n] parameter, or maximum SNR margin. This approach allows systems characterized by excess margin to perform power cutback such that certain tones are allowed more protection against noise than others. For example, tones where abrupt noise changes are observed to have an impact may be allowed a MAXSNRM of 20 dB, while tones with no such impact may be allowed a MAXSNRM of only 6 dB. This practice combines the benefit of having a MAXSNRM setting, forcing power reduction in cases of connections with excess margin, with the benefit of giving preferential treatment to certain frequencies so that they can more effectively cope with abrupt noise change.

5. Another novel approach offering better protection for those tones experiencing abrupt noise changes is to mark such tones so that the bit-swapping behavior is more conservative for such tones. In one embodiment, marked tones are prevented from increasing their number of loaded bits using bit-swapping. Such a measure assures that time-varying noise can only make those tones decrease their number of loaded bits. Thus, some temporary improvement in the noise conditions after initialization does not result in a higher number of bits for those tones where noise may later be abruptly increased and possibly cause an undesired line failure.

6. In another embodiment, marked tones may be prevented from increasing their number of loaded bits using bit-swapping, only after they reach a certain number of loaded bits. This approach can be viewed as a variation of BCAP[n], with the significant difference being that the "bit cap" constraint applies to the operation during SHOWTIME, and does not necessarily apply for the loading algorithm during initialization.

If at 605 severe noise impulses 620 are determined to be the cause of link instability, then one or more particular steps 625, according to embodiments of the invention, may mitigate the problem. Severe noise impulses causing such link instability are typically characterized by impulse noise signals with voltages strong enough to cause the DSL modem surge protection circuitry to be activated. During that time, the received signal is seriously corrupted, and logic may be activated to initiate a retrain. The triggering of a retrain can be based on criteria such as loss-of-margin (LOM) indications, an excessive number of code violations within a short period of time, and others.

A possible mitigation strategy is to adjust the trigger conditions for retrain, so that when a sever noise impulse is observed, a restrain is not immediately initiated. If there is knowledge of severe noise impulses affecting a link, then making the retrain conditions more stringent will make retrain events more rare. A DSL system may then be able to recover from such severe noise impulses while remaining in Showtime, and using Showtime adaptation techniques. Examples of adjusting such trigger conditions follow:

Adjust MINSNRM to smaller values, so that loss-of-margin does not trigger a retrain.

Adjust the threshold for code violations per unit of time, which triggers a retrain.

Adjust the threshold for decoder errors per unit of time, which triggers a retrain.

These trigger conditions may also relate to an SOS event. At times when a receiver detects a severe degradation of the signal, the corresponding DSL modems may use the SOS protocol to negotiate a substantial reduction of the data rate. This approach can be considerably faster compared to the process of a complete retrain, which leads to no or minimal interruption to the DSL service. The conditions for triggering such an SOS event can be similar to those described above for retrains, such as loss-of-margin indications, excessive counts of code violations within a period of time, excessive counts of decoder errors within a period of time, etc.

These methods can be further enhanced if logic is included in the analog front end of the modem to detect the occurrence of a severe noise impulse. The output of such logic would be a signal to the modem's controller circuitry that would indicate that a retrain should not be performed for the duration of the severe noise impulse and for a few seconds after the noise impulse has disappeared.

If at 605 power loss events 630 are determined to be the cause of line instability, then, at 635, according to embodiments of the invention, no DSL reconfiguration step is taken to mitigate this effect. Other actions such as notifying operations, or notifying the customer of this issue may however be taken.

If at 605 intermittent impulse noise events 640 are determined to be the cause of poor line quality, then at step 645, one or more particular reconfigurations of the DSL link according to embodiments of the invention may mitigate the problem.

Knowing or having an estimate of the impulse noise width and period can aid with properly configuring the DSL link to provide adequate impulse noise protection. The estimate of the impulse noise width is useful for choosing the parameter of minimum impulse noise protection. Specifically, the minimum impulse noise protection must be chosen to be at least as long as the estimated impulse noise width. At the same time, the codeword span must be shorter than the estimated impulse noise period. The codeword span can be approximated by the interleaver delay quantity. A set of conditions for configuring the DSL link follow:

1. Minimum impulse noise protection>estimated impulse noise width;
2. Maximum delay<estimated impulse noise period.

If the second condition cannot be met, then the minimum impulse noise protection must be further increased, so that the RS code can cope with multiple impulse noise occurrences within the codeword span.

Similar criteria can be used for configuring the DSL systems' retransmission module to provide adequate impulse noise protection. In potential DSL systems implementing retransmission techniques at the PHY layer, there exist configuration parameters for retransmission, such as minimum impulse noise protection, maximum delay, minimum inter-arrival time, and minimum RS overhead. Such configuration parameters may be programmed as follows:

1. Minimum impulse noise protection>estimated impulse noise width
2. Minimum inter-arrival time<estimated impulse noise period
3. Maximum delay<delay budget
4. Minimum RS overhead>x*(estimated number of bytes in error as a percentage of all bytes in a RS codeword), where x=2 without erasure decoding, and 1=<x< 2 with erasure decoding. (Note that the Minimum RS overhead may be controlled either directly, or indirectly, e.g. through controlling parameters for FEC.)

The above rules for choosing the configuration parameters are further explained: Certain DSL modems may employ simultaneously re-transmission modules and modules implementing Forward-Error-Correction (FEC, e.g. RS encoding/decoding) and interleaving. In such cases, the configuration parameters may include parameters related to both the re-transmission module, and to the FEC and interleaving modules. For such embodiments, there are trade-offs that exist between using re-transmission and FEC for correcting impulse noise. The relative preference towards one versus the other depends on the impulse noise characteristics.

More specifically, if the estimated impulse noise period is relatively short compared to the duration of a DMT symbol, then this indicates that the impulse noise is persistent, and that retransmission schemes used alone may be incapable of providing proper protection. If impulse noise affects a large number of consecutive DMT symbols, then attempts to retransmit those symbols will result in further failures, and may eventually cause retransmission buffers to overflow. On the other hand, if RS coding can correct for the errored bytes in the consecutive DMT symbols, then the combination of retransmission with RS coding will lead to error-free transmission. In such cases, a selection of the configuration parameters as indicated above would be most beneficial.

The configuration parameter for minimum impulse noise refers to protection offered at the input point of the RS decoder (or of the re-transmission module), and not at the tip-to-ring point of the modem. An impulse of a certain length at tip-to-ring may spread and have a larger width after undergoing receiver processing. It is also noted that practical designs have limitations on the possible choices for minimum impulse noise protection, maximum delay, and data rate. Such limitations can be taken into account when configuring the DSL link.

An additional technique for reducing the impact of intermittent impulse noise is to adjust the bit loading on those tones which are known or suspected to be strongly affected by such noise. Example methods are here outlined:

1. Use BCAP[n] to force tones to load with a smaller number of bits. Such programming of BCAP[n] reduces the number of tones with a large number of bits and possibly increases the number of tones with a smaller number of bits. This has the effect of increasing impulse noise immunity, especially when impulse noise is the result of receiver clipping. Assuming that impulse noise has approximately the same strength on those tones which are affected (as is the case with receiver clipping), then tones loaded with a small number of bits have improved immunity, compared to tones loaded with a large number of bits. Thus, by not allowing tones to be loaded with a large number of bits, the overall impulse noise immunity is improved.
2. Increase protection over those tones that may be strongly affected by impulse noise. Example techniques for achieving that include:
    a. Disabling those tones by use of CARMASK, PSDMASK or other equivalent parameters.
    b. Use of BCAP[n] for those tones to force a small number of bits.
    c. Use of PSDMASK or TARSNRM[n] for those tones to force a small number of bits.

Yet another technique, explained in more detail below, for improving the robustness of the DSL link to impulse noise is to use the knowledge about tones most affected by such noise in order to aid the Reed Solomon (RS) decoder of the DSL receiver.

RS encoding adds a certain number of "parity" bytes to a number of "payload" bytes to form an RS codeword. At the RS decoder, the number of bytes in error that can be corrected per RS codeword is generally equal to one half the numbers of parity bytes. In this latter case, it is said that "erasure" decoding is performed. A challenge in implementing receivers with erasure decoders is the need to have information about the location of the bytes in errors, or the erasures.

Figure 7:
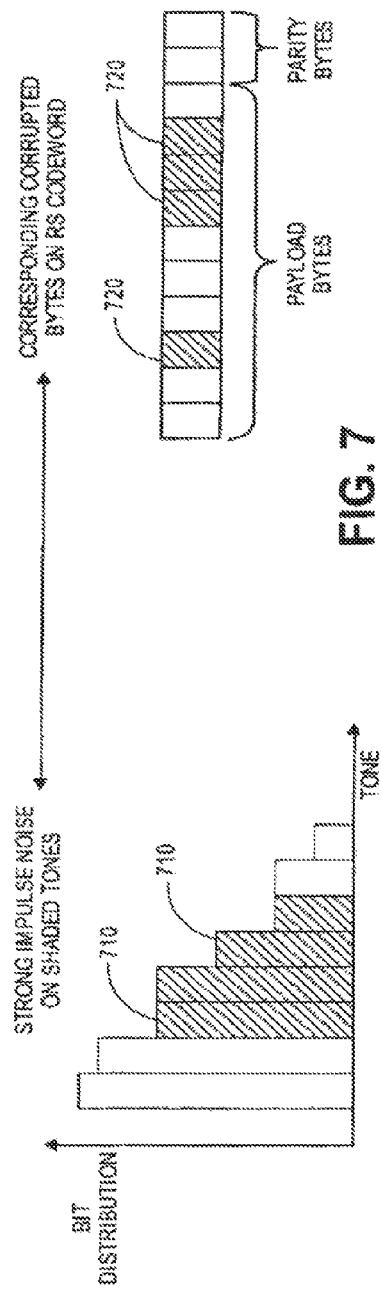
FIG. 7 illustrates the locations of bytes within a RS codeword that have high probability of being corrupted by impulse noise, in accordance with an embodiment of the invention.

However, knowledge of the tones where impulse noise has the strongest effect is valuable for erasure decoding. Starting from the tone information, provided by embodiments of the invention, a reliable erasure forecasting process can be constructed which can identify the locations of the bytes within a RS codeword that have high probability of being corrupted by impulse noise. This illustrated in FIG. 7.

If at 605 repetitive impulse noise events 650 are determined to be the cause of line instability, then at step 655, a certain DSL reconfiguration can help with the mitigation of this effect.

The same techniques as those described for intermittent impulse noise can be applied, but with one important difference: With repetitive impulse noise, the averaged receiver noise (or equivalently the measured margins, or measured SNR levels) is affected by the impulses. This effect can be advantageously used during noise characterization to more accurately identify the frequencies where impulse noise has the strongest effect.

By knowing these frequencies, techniques for reducing the impact of impulse noise by adjusting the bit loading can be made more effective. Example methods are next outlined:

1. Set BCAP[n]=BITS[n]−2, for those values of n corresponding to affected frequencies. BITS[n] is the bit distribution previously obtained.
2. Set BCAP[n]=0, (or set CARMASK[n]=1, or set PSDMASK[n]=−100 dBm/Hz) for those values of n corresponding to affected frequencies.
3. Set PSDMASK[n]=−70 dBm/Hz, (or set TARSNRM[n]=40 dB) for those values of n corresponding to affected frequencies.

FIG. 8 illustrates a typical computer system that can be used by a user and/or controller in accordance with one or more embodiments of the invention. The computer system 800 includes any number of processors 802 (also referred to as central processing units, or CPUs) that are coupled to storage devices including primary storage 806 (typically a random access memory, or RAM), primary storage 804 (typically a read only memory, or ROM). As is well known in the art, primary storage 804 acts to transfer data and instructions uni-directionally to the CPU and primary storage 806 is used typically to transfer data and instructions in a bi-directional manner. Both of these primary storage devices may include any suitable of the computer-readable media described above. A mass storage device 808 also is coupled bi-directionally to CPU 802 and provides additional data storage capacity and may include any of the computer-readable media described above. The mass storage device 808 may be used to store programs, data and the like and is typically a secondary storage medium such as a hard disk that is slower than primary storage. It will be appreciated that the information retained within the mass storage device 808, may, in appropriate cases, be incorporated in standard fashion as part of primary storage 806 as virtual memory. A specific mass storage device such as a CD-ROM 814 may also pass data uni-directionally to the CPU.

CPU 802 also is coupled to an interface 810 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to a computer or telecommunications network using a network connection as shown generally at 812. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 808 or 814 and executed on CPU 802 in conjunction with primary memory 806. In a preferred embodiment, the controller is divided into software submodules.

The many features and advantages of the invention are apparent from the written description, and thus, the appended claims are intended to cover all such features and advantages of the invention. Further, since numerous modifications and changes will readily occur to those skilled in the art, the invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A computer-implemented method associated with a digital subscriber line (DSL) link, comprising:
    receiving, at a controller, data indicative of a distribution over time of line performance monitoring data for the DSL link, the data indicative of the distribution comprising a count for each of a plurality of line parameters measured over a corresponding plurality of time intervals in the distribution over time;
    determining at the controller whether the data indicative of the distribution over time of performance monitoring data indicates a level of quality of the DSL link that is above or below a minimum threshold based on counts for two or more number of the plurality of line parameters; and
    if the level of quality of the DSL link is below the minimum threshold, the controller:
        characterizing whether the level of quality is associated with impulse noise events; and
        recording a characterization of the impulse noise events associated with the DSL link.

2. The computer-implemented method of claim 1, wherein characterizing whether the level of quality is associated with impulse noise events, further comprises characterizing whether the impulse noise events associated with the DSL link are intermittent.

3. The computer-implemented method of claim 2, wherein characterizing whether the level of quality is associated with impulse noise events, further comprises characterizing whether the impulse noise events associated with the DSL link are persistent.

4. The computer-implemented method of claim 1 wherein determining, at the controller, whether the data indicative of the distribution over time of performance monitoring data indicates a level of quality of the DSL link that is above or below a minimum threshold comprising measuring at least one of a count of CV, ES, SES, UAS, LOSS, or derivations thereof, over the distribution.

5. The computer-implemented method of claim 3, wherein characterizing whether impulse noise events associated with the DSL link are intermittent or persistent comprises determining a duration of the impulse noise events.

6. The computer-implemented method of claim 1, wherein recording the characterization of the impulse noise events where associated with the DSL link further comprising recording at least one of a date, time, duration, and affected frequency, associated with each of the impulse noise events.

7. The method of claim 1, further comprising the controller reconfiguring the DSL link responsive to the recorded characterization of impulse noise events.

8. The computer-implemented method of claim 7, wherein if the impulse noise events associated with the DSL link are characterized as intermittent, then the controller reconfiguring the DSL link comprises the controller increasing settings associated with impulse noise protection for the DSL link.

9. The computer-implemented method of claim 7, wherein if the impulse noise events associated with the DSL link are characterized as persistent, then the controller reconfiguring the DSL link comprises the controller increasing settings associated with impulse noise protection for the DSL link, including:
    forcing affected frequencies to load with a smaller number of bits (BCAP[n]);
    disabling affected tones; and
    increasing a PSDMASK or a target margin for the affected tones.

10. An article of manufacture comprising a non-transitory computer readable medium containing instructions that when executed by a computing system, cause the computing system to perform the following steps:
    receiving at a controller data indicative of a distribution over time of performance monitoring data for a Digital Subscriber Line (DSL) link, the data indicative of the distribution comprising a count for each of a plurality of line parameters measured over a corresponding plurality of time intervals in the distribution over time;
    determining at the controller whether the data indicative of the distribution over time of performance monitoring data indicates a level of quality of the DSL link that is above or below a minimum threshold based on counts for two or more number of the plurality of line parameters; and
    if the level of quality of the DSL link is below the minimum threshold:
        characterizing whether impulse noise events associated with the DSL link are intermittent or persistent; and
        recording the characterization of the impulse noise events associated with the DSL link.

11. The article of manufacture of claim 10, wherein the instructions for recording the characterization of the impulse noise events where associated with the DSL link further comprises instructions for recording at least one of a date, time, duration, and affected frequency, associated with each of the impulse noise events.

12. The article of manufacture of claim 10, further comprising instructions that when executed by the computing system, cause the computing system to perform the step of reconfiguring the DSL link responsive to the recorded characterization of impulse noise events.

13. A apparatus associated with a digital subscriber line (DSL) link, comprising:
    collecting means for receiving data indicative of a distribution over time of performance monitoring data for the DSL link, the data indicative of the distribution comprising a count for each of a plurality of line parameters measured over a corresponding plurality of time intervals in the distribution over time;
    analyzing means for determining:
        whether the data indicative of the distribution of performance monitoring data indicates a level of quality of the DSL link that is above or below a minimum threshold based on counts of two or more number of the plurality of line parameters; and if the level of quality of the DSL link is below the minimum threshold:
characterizing whether impulse noise events associated with the DSL link are intermittent or persistent; and
recording the characterization of the impulse noise events associated with the DSL link.

14. The apparatus of claim 13, wherein the performance monitoring data comprises at least one of channel-, line-, or higher-layer performance monitoring data.

15. The apparatus of claim 13, wherein the analyzing means for characterizing whether impulse noise events associated with the DSL link are intermittent or persistent determines a duration of the impulse noise events as an indication of an intermittent or persistent impulse noise event.

16. The apparatus of claim 13, further comprising means for reconfiguring the DSL link responsive to the recorded characterization of impulse noise events.

17. The apparatus of claim 16, wherein if the impulse noise events associated with the DSL link are characterized as intermittent, then the means for reconfiguring the DSL link changes settings associated with impulse noise protection for the DSL link.

\* \* \* \* \*